United States Patent [19]

Torisawa et al.

[11] Patent Number: 4,928,050
[45] Date of Patent: May 22, 1990

[54] RECORDER

[75] Inventors: Akira Torisawa, Machida; Masaaki Kakizaki, Kawasaki; Noriaki Ito; Shigeru Yoshimura, both of Yokohama, all of Japan

[73] Assignee: Canon Kabushiki Kaisha, Tokyo, Japan

[21] Appl. No.: 302,196

[22] Filed: Jan. 27, 1989

[30] Foreign Application Priority Data

Jan. 29, 1988 [JP] Japan .................................. 63-16855
Mar. 20, 1988 [JP] Japan .................................. 63-122034

[51] Int. Cl.$^5$ ............................................. H02P 8/00
[52] U.S. Cl. ...................................... 318/696; 318/685
[58] Field of Search ................................. 318/696, 685

[56] References Cited

U.S. PATENT DOCUMENTS

| | | | |
|---|---|---|---|
| 3,900,780 | 8/1975 | Tanikoshi | 318/254 |
| 3,946,292 | 3/1976 | Tanikoshi | 318/138 |
| 4,051,420 | 9/1977 | Tanikoshi | 318/254 |
| 4,389,605 | 6/1983 | Noda | 318/696 |
| 4,415,845 | 11/1983 | Oudet | 318/696 |
| 4,484,124 | 11/1984 | White et al. | 318/696 |
| 4,513,236 | 4/1985 | Kikukawa et al. | 318/696 |
| 4,746,847 | 5/1988 | Kikugawa | 318/696 |
| 4,794,292 | 12/1988 | Torisawa | 310/257 |

FOREIGN PATENT DOCUMENTS 2127241A 1/1983 United Kingdom .
2138226A 10/1984 United Kingdom .

*Primary Examiner*—William M. Shoop, Jr.
*Assistant Examiner*—Saul M. Bergmann
*Attorney, Agent, or Firm*—Fitzpatrick, Cella, Harper & Scinto

[57] ABSTRACT

A data recorder in which a recording is moved by stepping motor whose rotor rotation angle is detected, the stepping motor having a current switching circuit which controls the application of excitation current to the drive coils of the motor in accordance with the detected rotation angle. A control circuit counts the detected result of the rotor rotation angle, detects the position of the head and generates start and stop control signals of the head, thereby starting and stopping switch-over control of the current switching circuit being effected.

9 Claims, 7 Drawing Sheets

RECORDER

BACKGROUND OF THE INVENTION

1. Field of the Invention

The present invention relates to a recorder, and more particularly to a serial recorder which uses a stepping motor as a drive source to move at least a recording head for scan.

1. Related Background Art

In a prior art serial recorder, a hybrid or permanent magnet (PM) type stepping motor or a brushless motor is frequently used as a motor for driving a carriage which carries a recording head for scan.

For example, the brushless motor usually uses a Hall element to detect a position of a magnetic pole of a rotor for controlling energization, and uses an optical or magnetic encoder to detect a velocity of the rotor.

Such a brushless motor, however, has the following problems.

(1) Positioning between stator magnetic poles and Hall elements is required.

(2) Where the energization is switched by the Hall elements, the positions of the Hall elements and the stator are uniquely defined and an energization method for the motor is fixed. For example, for a 180° energization control and a 90° energization control, the positions of the Hall elements relative to the stator magnetic poles differ by 45° electrically from each other. Accordingly, in order to effect two different energization controls to one motor, it is necessary to double the number of Hall elements and arrange them at appropriate positions for the energization control.

Japanese Patent Applications Laid-Open Nos. 62-193548 and 62-193549 disclose stepping motors which use an encoder output to control the energization. They merely disclose structures of motors having encoders arranged at predetermined positions but do not disclose a motor drive control circuit nor a method therefor.

A prior filed U.S. application Ser. No. 401,483, filed Aug. 30, 1989, which is a continuation of U.S. application Ser. No. 259,259, filed Oct. 18, 1988, and assigned to the assignee of the subject application, discloses a controller for a stepping motor, in which an encoder having marks which are equal in number to an integer multiple of the number of magnetic poles of a rotor is fixed to a shaft of the rotor, and the number of marks of the encoder is counted at a predetermined position on a stator as the rotor is rotated and the energization to the coils of the stator is switched when the count reaches a predetermined value. In the past, the drive control for the stepping motor has been effected by open-loop controlling the number of drive pulses for the motor and a pulse frequency in a simple manner. However, when a stepping motor is used as the carriage drive motor and it is driven by an open loop control, an offensive noise "queen" due to vibration of a rotor of the stepping motor is generated. When the carriage is moved, stopped or reversed, that is, when the stepping motor is started, stopped or reversed, a large noise "bang" is generated because the stepping motor is started or stopped with vibration. Those noises are problem in a relatively noise-free printer such as bubble jet printer or ink jet printer.

The brushless motor may be used as the carriage drive motor. However, the brushless motor has a long rise time at the start-up and hence it is not appropriate as a carriage drive motor which repeats, starts, stops and reverses for each line. High speed recording is not attained with such brushless motor.

SUMMARY OF THE INVENTION

It is an object of the present invention to provide a reliable and durable recorder which solves the problems encountered in the prior art recorders and which permits high speed recording.

It is another object of the present invention to provide a recorder having means for shorting a coil held in a non-exciting state by current switching means to close-loop control the drive of the stepping motor.

Other objects of the present invention will be apparent from the following description of the preferred embodiments.

BRIEF DESCRIPTION OF THE DRAWINGS

FIGS. 5A to 5C show time charts therebetween.

DETAILED DESCRIPTION OF THE PREFERRED EMBODIMENTS

Figure 1:
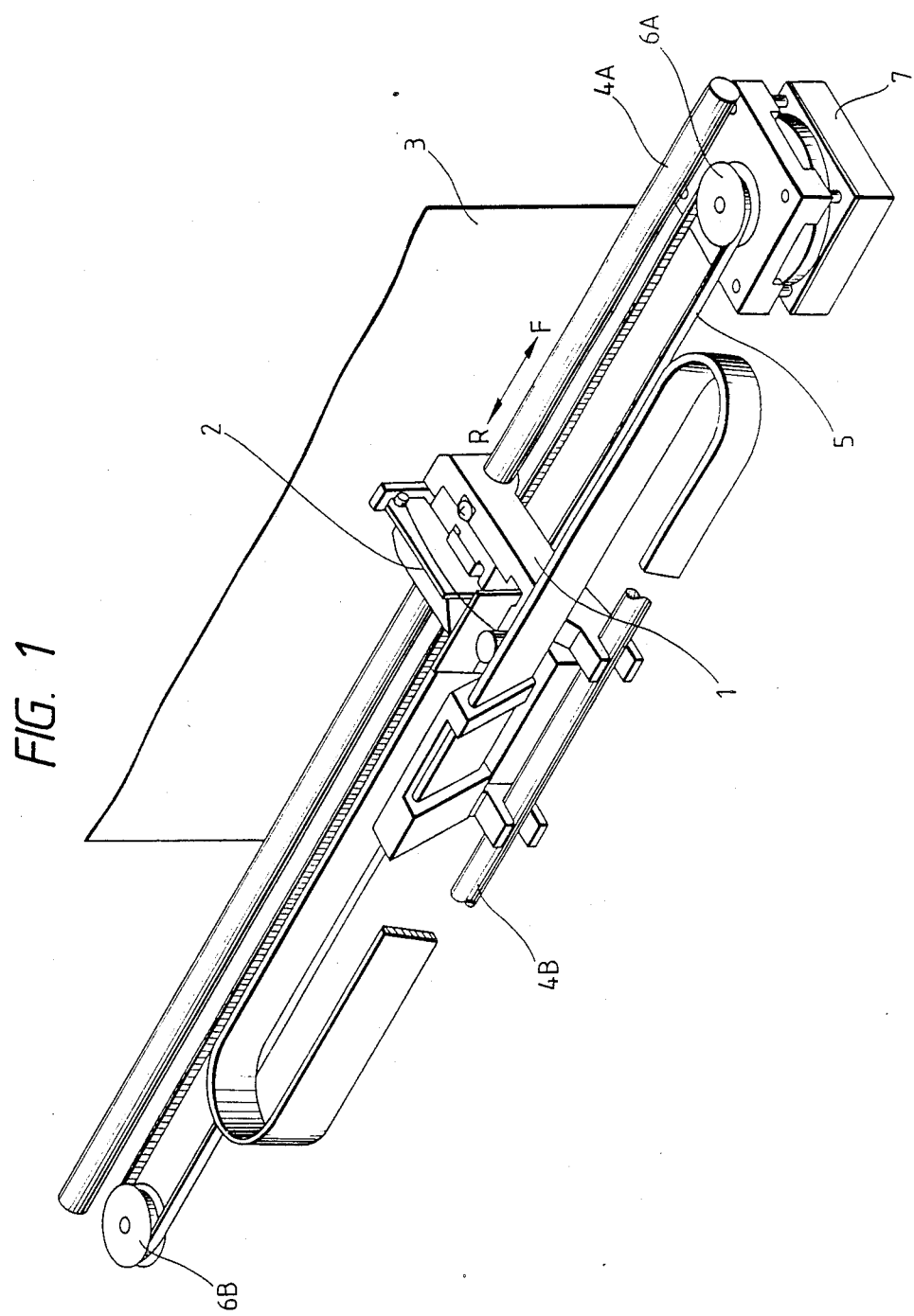
FIG. 1 shows a perspective view of a structure of a carriage drive mechanism in accordance with a first embodiment of the present invention.

FIG. 1 shows a drive mechanism for a carriage which carries a recording head in accordance with one embodiment of the present invention. Numeral 1 denotes a carriage which carries an ink jet recording head 2 and is slidably supported by guide shafts 4A and 4B which extend parallel to a platen (not shown) which holds a record sheet 3. A belt 5 is connected to the carriage 1. It spans between pulleys 6A and 6B and is driven by a carriage drive motor 7.

The carriage 1 is slid along the record sheet 3 in a direction F or R. The recording head 2 is energized during one drive of the carriage, 1 in the F or R direction so that one line of dots is recorded. Each time one line has been recorded, the record sheet 3 is fed upward by one line increment and the carriage is returned. By repeating this, recording is done serially line by line.

An example of drive conditions required for the carriage drive motor in the recording operation is that a rotation speed of the carriage drive motor 7 is approximately 800 rpm in a high recording speed mode, and approximately 400 rpm in a low recording speed mode, assuming that a recording density is 360 dots/inch. In the high speed mode, the time required from the start to the constant speed drive (rotation speed 800 rpm) is approximately 60 msec, the constant speed drive time is approximately one second, and the time required to stop from the constant speed drive is approximately 60 msec.

Figure 2:
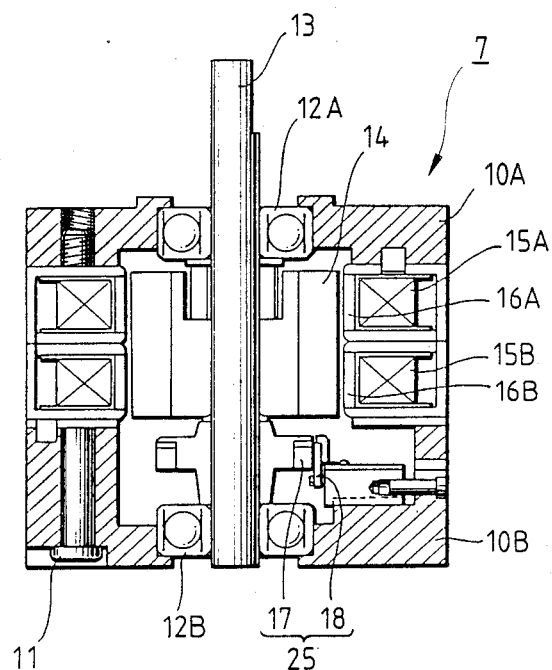
FIG. 2 shows a sectional view of a structure of a carriage drive motor used in FIG. 1.

FIG. 2 shows a structure of the carriage drive motor 7 in the present invention, which is driven under the above conditions.

In FIG. 2, numerals 10A and 10B denote bodies which support the entire carriage drive motor 1. The bodies 10A and 10B vertically face each other and are fixed to each other through a screw 11.

A rotor shaft 13 which is an output rotating shaft of the motor 1 is rotatably supported by the bodies 10A and 10B through bearings 12A and 12B. A rotor 14 which is a cylindrical permanent magnet is fixed at the center of the rotor shaft 13. A plurality (24 in this embodiment) of N magnetic poles and a plurality (24) of S magnetic poles are provided on an outer periphery of the rotor 14 alternately and at a constant circumferential pitch.

Two ring-shaped stators 16A and 16B having coils 15A and 15B wound thereon are held between the bodies 10A and 10B externally of the rotor 14 in a vertical alignment to allow loose fitting of the rotor 14 in central openings of the stators 16A and 16B. Magnetic poles are provided at the same pitch as that of the magnetic poles on the rotor 14 on inner peripheries of the stators 16A and 16B which face the outer periphery of the rotor 14. The magnetic poles of the stator 16A and the magnetic poles of the stator 16B are staggered from each other circumferentially by ¼ pitch of the magnetic poles.

By switching the exciting currents to the coils 15A and 15B in a single-phase excitation system with the above structure, the attraction and repulsion by the magnetic forces between the magnetic poles of the stators 16A and 16B and the magnetic poles of the rotor 14 are repeated so that the rotor 14 is rotated with the rotor shaft 13. Where 24 N magnetic poles and 24 S magnetic poles of the rotor 14 are provided, one revolution of the rotor 14 is completed by switching the excitation current 48 times.

Since the magnetic poles of the stators 16A and 16B are staggered from each other as described above, the rotor 14 may be rotated in either one of the circumferential directions by reversing the sequence of excitation of the stators, 16A and 16B.

The basic structure of the carriage drive motor 1 is same as that of a conventional PM type stepping motor. In addition to the basic structure of the PM type stepping motor, the carriage drive motor 1 of the present embodiment is provided with an encoder to detect the rotation angle of the rotor 14 or positions of the magnetic poles on the rotor 14 in order to attain low noise and high speed drive.

The encoder comprises a detection disk 17 fixed to the rotor shaft 13 and an MR element (magneto-resistive effect element) substrate 18 fixed to the body 10B to face the outer periphery of the disk 17. A plurality (144 in this embodiment) of N and S magnetic poles are provided on the outer periphery of the detection disk 17 alternately and at a constant pitch. Two MR elements (not shown) are provided on that plane of the MR element substrate 18 which faces the detection disk 17, at adjacent positions slightly spaced from each other in the circumferential direction of the disk 17.

As the disk 17 is rotated by the rotation of the rotor 14, each time a magnetic pole of the disk 17 moves past the two MR elements on the MR element substrate 18, two pulse signals having a 90° phase difference therebetween are produced by the two MR elements as an encoder output. When 144 magnetic poles of the detection disk 17 are used, the number of output pulses of the encoder per one revolution of the rotor 14 is 288. The pulses from the two MR elements have the 90° phase difference therebetween in order to allow detection of the direction of rotation of the rotor 14.

In the present embodiment, the drive of the carriage drive motor 1 is close-loop controlled in accordance with the detection output of the encoder. Specifically, switching timing of the excitation current of the coils 15A and 15B of the carriage drive motor 1 and rotation speed are controlled.

Figure 3:
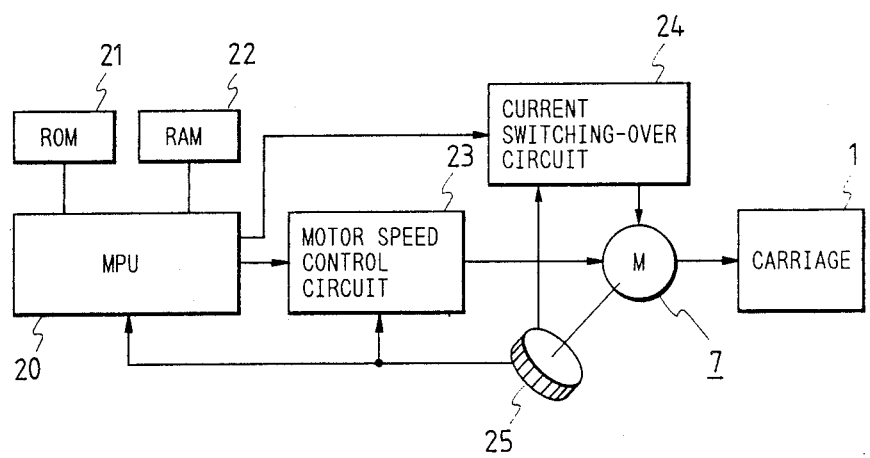
FIG. 3 shows a block diagram of a motor drive control unit.

FIG. 3 shows a configuration of a motor drive control unit which close loop controls the carriage drive motor 1.

In FIG. 3, numeral 20 denotes a microprocessor unit (MPU) which provides overall control for a printer and which controls drive sources for various mechanisms (not shown) of the printer by processing data stored in a random access memory (RAM) 22 in accordance with a control program stored in a read-only memory (ROM) 21, and controls the drive of the carriage drive motor 7 which drives the carriage 1. The MPU 20 counts the output pulses of the encoder 25 which comprises the detection disk 17 and the MR element substrate 18 by a hardware or software counter (not shown) to detect the position of the carriage 2.

The MPU 20 controls the rotation speed of the carriage drive motor 7 to the high speed mode or the low speed mode through a motor speed control circuit 23, switches the excitation currents of the coils 15A and 15B of the carriage drive motor 7, and controls the start, stop and direction of rotation of the motor 7 or the start, stop and direction of movement of the carriage 1 through a current switching circuit 24 which drives the carriage drive motor 7.

The motor speed control circuit 23 close-loop controls the rotation speed of the carriage drive motor in accordance with the detection output of the encoder 25. Specifically, the circuit 23 compares an interval of the output pulses of the encoder 25 with a reference and controls the magnitude of the excitation current or voltage for the motor 7 in accordance with the comparison result so that the difference between the interval and the reference is reduced to zero. Such a circuit has been known and detailed description thereof is omitted.

The MPU 20 directs to the motor speed control circuit 23 the rotation speed of the carriage drive motor 7. As a result, the motor speed control circuit selects the comparison reference corresponding to the directed speed so that it is compared with the pulse interval to select the rotation speed of the motor 7 to the high speed mode or low speed mode.

On the other hand, the current switching circuit 24 starts the switching of the excitation current in response to a start signal supplied from the MPU 20 to start the carriage drive motor 7, and stops the carriage drive motor 7 in response to a stop signal supplied from the MPU 20. In order to stop the carriage drive motor 7, the coils of the motor 7 may be shorted. Thus, the carriage drive motor 7 functions as a generator and kinetic energy generated by the carriage 1 is converted to electric energy for generating electricity and thence to thermal energy, which is rapidly dissipated. As a result, the carriage drive motor 7 is smoothly and rapidly stopped. In this manner, the noise generated when the carriage drive motor 7 is stopped, that is, when the carriage 1 is stopped is effectively suppressed.

The current switching circuit 24 not only drives and stops the carriage drive motor 7 but also close-loop controls the switching timing of the excitation currents of the coils of the carriage drive motor 7 in accordance with the detection output of the encoder 25. To this end, the current switching circuit 24 has a counter (not shown) which counts the output pulses of the encoder 25. When the count reaches a predetermined value, the excitation current is switched.

In the present embodiment, the current switching in the carriage drive motor 7 occurs 48 per revolution of the rotor 14 in the single phase excitation system, and the number of output pulses of the encoder 25 is 288. Since the rotor 14 is rotated by a constant angle for each pulse output, if the excitation current is switched each count of six (=288/48) pulses, the excitation current can be switched at such a timing that the relative positions of the magnetic poles of the rotor 14 and the magnetic poles of the stators 16A and 16B are at the predetermined relation at a predetermined timing after the rotation of the constant angle. Thus, in the present embodiment, the excitation current is switched at every count of six the pulses. In order to assure that the excitation current is switched at the timing of appropriate and preferable positional relation between the magnetic poles of the rotor 14 and the magnetic poles of the stators 16A and 16B so that the carriage drive motor 7 is smoothly driven, the MPU 20 controls the initialization such that the count of the counter is set to zero and the position of the rotor 14 is set to a preferable position for the switching of the excitation current.

Assuming that the switching of the excitation current is to be effected when the center of the magnetic pole (most strongly magnetized area) reaches a mid-point between the stators 16A and 16B, that is, when a drive torque in the two-phase excitation mode is zero, the initialization may be done in the following manner.

Current is supplied to both of the coils 15A and 15B in the same direction at the same time for more than a predetermined period. The rotor 14 is slightly rotated by the excitation of the coils, and the centers of the magnetic poles of the rotor 14 are moved to the mid-points of the stators 16A and 16B of the excited coils, that is, to positions corresponding to 1/8 of the stator magnetic pole pitch. When the rotor 14 stops, the count of the counter is set to zero and the excitation current to the coils 15A and 15B is cut off.

This initialization provides a correct relation between the count of the switching timing of the excitation current and the positions of the magnetic poles of the rotor 14. Namely, it provides a correspondence between the six counts of the pulses and the predetermined switching time. This relation is maintained after the initialization until the power supply of the printer is turned off.

A physical deviation of the relative positions between the magnetic poles of the detection disk 17 and the magnetic poles of the rotor 14 does not pose a significant problem. In the present embodiment, the rotor 14 has 24 magnetic poles while the detection disk 17 has 144 magnetic poles and the encoder produces 288 output pulses per revolution. The number of output pulses per magnetic pole of the rotor 14 is 12. Assuming that a range of pulse deviation due to physical deviation is one half of the pulse interval, the corresponding range of error is ±4.2% (=±1/24×100%), and a deviation of the corresponding timing for switching the excitation current may be neglected. Accordingly, adjustment of the relative position of the rotor 14 and the disk 17 is not necessary, and the detection of the magnetic poles of the rotor 14, that is, the detection of the rotation angle of the rotor 14 is attained without any adjustment.

Figure 4A:
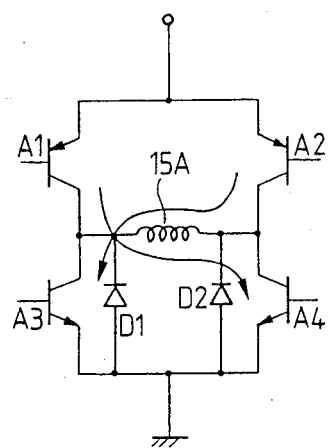
FIGS. 4A to 4C show circuit configurations of drive circuits.
Figure 4B:
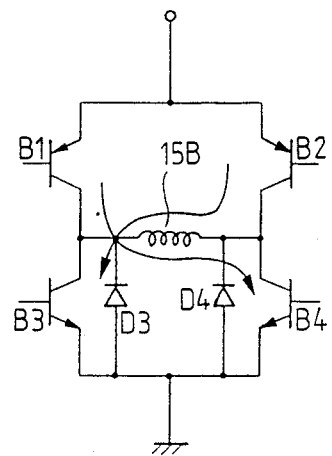
Figure 4C:
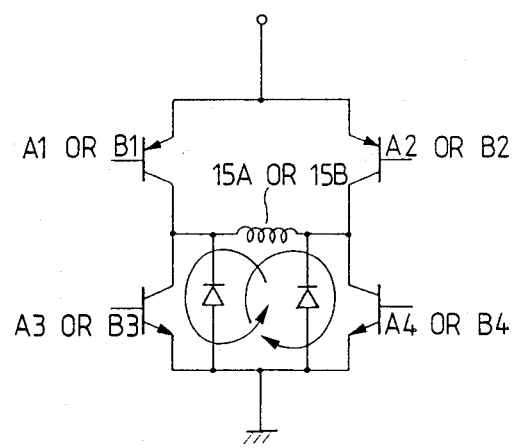
Figure 5A:
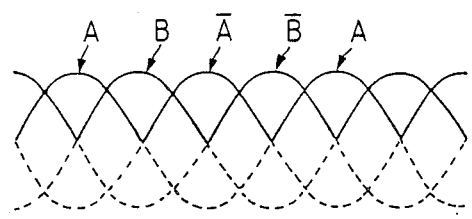
FIG. 5A shows a waveform of a drive torque for the motor.
Figure 5B:
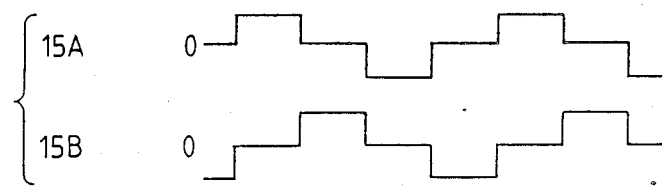
FIG. 5B shows a waveform of a current of the motor.
Figure 5C:
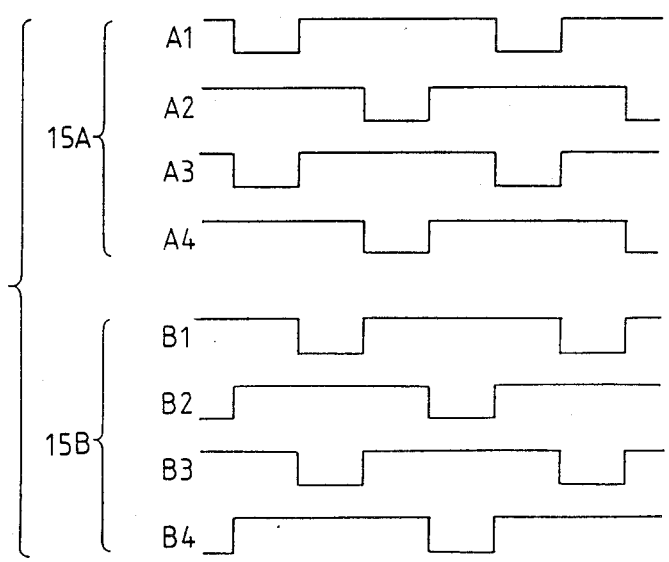
FIG. 5C shows a waveform of a base potential in each of transistors of the motor drive circuit.

A method for driving the motor 7 is now explained with reference to FIGS. 4A to 4C and 5A to 5C. FIGS. 4A to 4C show drive circuits for the motor 7. FIG. 5A shows a drive torque of the motor 7, FIG. 5B shows supply currents to the coils 15A and 15B of the motor 7, and FIG. 5C shows a time chart of base potentials in transistors of the motor drive circuit. As shown in FIGS. 4A to 4C, the coils 15A and 15B are connected to mid-point of a bridge circuit comprising four transistors $A_1$ to $A_4$ or $B_1$ to $B_4$, and reversal currents shown in FIG. 5B are supplied to those coils. The coils are driven in the single phase excitation system, and the torque characteristic thereof is shown by a solid line in FIG. 5A. FIG. 5C shows a time chart of base potentials of the drive transistors $A_1$ to $A_4$ and $B_1$ to $B_4$. The abscissas in FIGS. 5B and 5C are equal to that of the torque characteristic of FIG. 5A.

As seen from those time charts, when one of the coils 15A and 15B is not energized, it is shorted as shown in FIG. 4C. When the coil 15A is excited, the coil 15B is shorted, and when the coil 15B is excited, the coil 15A is shorted. Thus, when one of the two coils 15A and 15B is driven, the other coil functions as a brake. In FIGS. 4A to 4C, $D_1$ to $D_4$ denote diodes which are inserted for effective braking. In FIG. 4A, the coil 15A is excited, and in FIG. 4B, the coil 15B is excited. Arrows indicate the directions of currents flowing in the coils 15A and 15B. In order to stop the motor 7, the coils 15A and 15B are simultaneously shorted as shown in FIG. 4C. By rendering the non-excited coil to function as a brake, the motor can be smoothly stopped.

Figure 6:
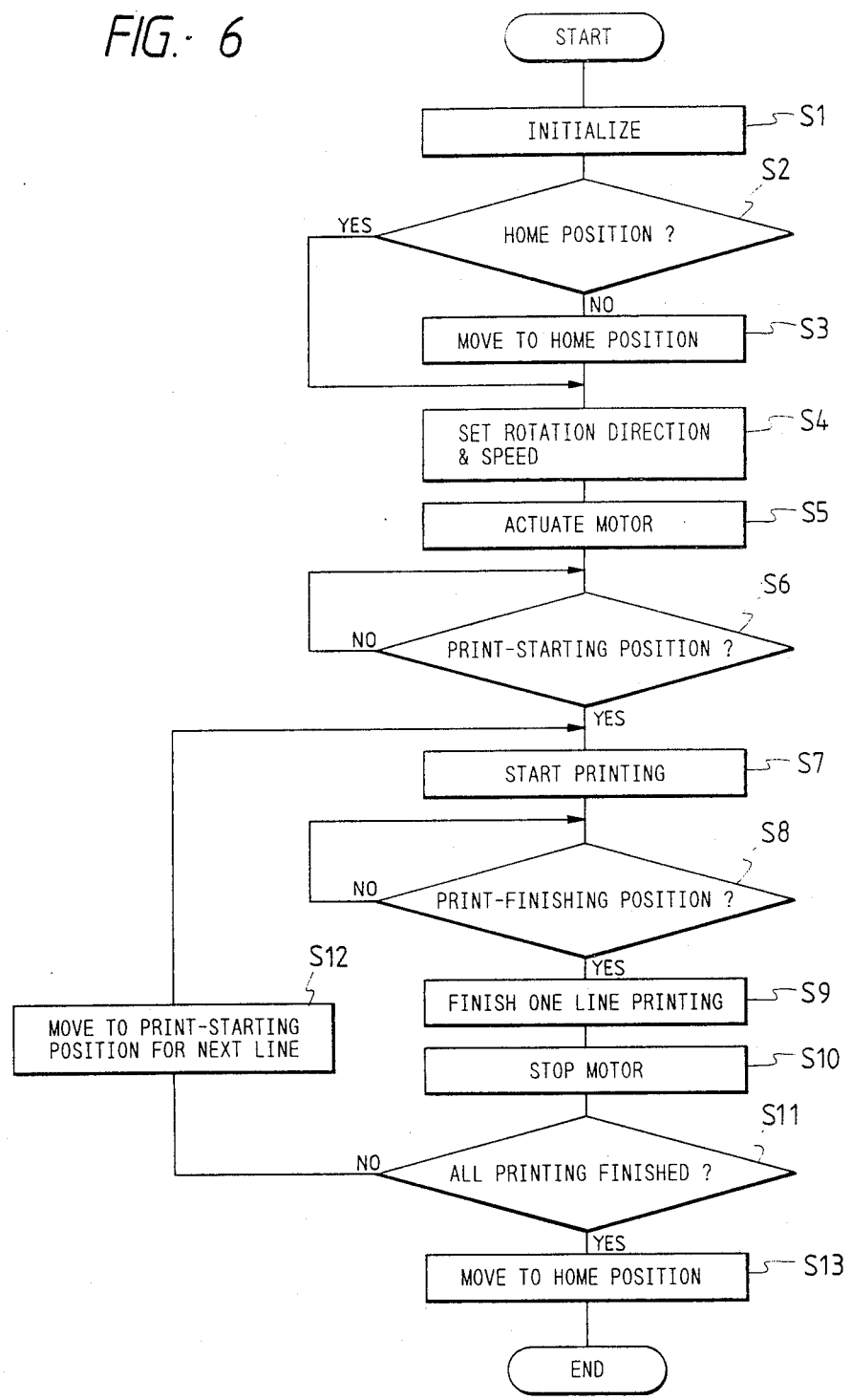
FIG. 6 shows a flow chart of a control process for the carriage drive motor in accordance with the present invention.

Referring to FIG. 6, the control operation for the carriage drive motor 7 by the MPU 20 in a record mode is explained. The control operation for other mechanisms by the MPU 20 is not explained here. A control program for a process shown in FIG. 6 is stored in the ROM 21.

When the printer is powered on, the MPU 20 first initializes in a step S1 to assure a correct relation between the position of the rotor 14 and the count of the counter of the current switching circuit 24.

In a step S2, whether the carriage 2 is at a home position at the left end in FIG. 1 is checked. If it is not, the carriage drive motor 7 is driven in a step S3 to move the carriage to the home position. While position detection to check whether the carriage 1 is at the home position is not illustrated, it may be effected by an optical sensor comprising a light emitting diode and a photo-transistor.

In a step S4, a rotation speed and a rotation direction of the motor 7 are determined in accordance with the record mode indicated by a host system (not shown), and the number of drive pulses for the carriage drive motor 7 is determined based on the number of characters per line.

A signal indicating a motor rotation speed is supplied to the motor speed control circuit 23. In a step S5, the carriage drive motor 7 is started by the current switching circuit 24. Thus, the carriage 1 is started. As the carriage drive motor 7 is started, the MPU 20 starts to count the output pulses of the encoder 25.

In a step S6, whether the carriage 1 has reached a print start position is checked based, on the count of the output pulses, and if it has reached that position, the recording head 2 is driven in a step S7 to start printing.

In a step S8, whether the carriage 1 has reached a print end position of the line is checked based on the count of the output pulse of the encoder 25, and if it has reached that position, the print operation of the recording head 4 is stopped in a step S9 to terminate the printing of the line. In a step S10, a stop signal is supplied to the current switching circuit 24, which responds to the stop signal to short the coil of the carriage drive motor 7 to stop the motor 7.

In a step S11, the MPU 20 checks whether all data have been printed, by the presence or absence of remaining print data.

If the printing of all print data is detected, the process proceeds to a step S13 where the carriage drive motor 7 is driven to move the carriage 1 to the home position. Then, the process is terminated.

In the step S11, if the printing of all data is not completed and there is print data for the next line, the process proceeds to a step S12 where the carriage drive motor 7 is driven to move the carriage 1 to the print start position for the next line. Then, the process returns to the step S7 and repeats the above steps.

In a reciprocal print mode, the print start position for the next line is the right end position of the next print line. Where the carriage drive motor 7 is reversely rotated to reversely (R direction in FIG. 1) move the carriage 1, the output pulses of the encoder are to be counted down to detect the position of the carriage 2.

In accordance with the present embodiment, the timing to switch the excitation current for the carriage drive motor 7 and the rotation speed of the motor are close-loop controlled in accordance with the output of the encoder 25 so that the excitation current is always switched at the optimum timing, the acceleration is sequentially and smoothly done and the carriage drive motor 7 is smoothly driven. Accordingly, the vibration of the carriage drive motor 7 is low and the noise during the drive is suppressed. When the carriage drive motor 7 stops, it is stopped smoothly and rapidly in the manner described above and the noise is also suppressed.

Since the carriage drive motor in the present embodiment is a multi-pole stepping motor, it provides a high torque. The maximum torque T of the motor is expressed by $T = k_p \phi NI$ (newton meter) where NI (ampere turn) is the magnetomotive force of the coil, $\phi$ (weber) is the magnetic flux generated by the rotor which links to the coil, p is the number of magnetic pole pairs of the rotor and k is a proportion constant. Thus a motor having a large number of magnetic poles like the stepping motor can generate a high torque. A response speed thereof is fast and high speed recording is attained.

In accordance with the present embodiment, the PM type stepping motor is modified to a DC brushless motor without adjustment for use as the carriage drive motor so that low noise and high speed serial printer operation is attained. The stepping motor does not pose a reliability problem due to a lifetime of contacts which occurs in the DC brushless motor.

In the present embodiment, the timing to switch the excitation current of the carriage drive motor 7 is set to the mid-point between the stators 16A and 16B, that is, ⅛ of the stator magnetic pole pitch, although the timing need not be limited thereto but other timing such as slightly earlier timing may be set. Instead of setting the switching timing to a constant predetermined timing different timings may be set depending on different conditions such as acceleration, low speed drive and deceleration. To this end, the count of the counter at which the current switching circuit 24 switches the excitation current may be changed depending on the condition under the control of the MPU 20.

In the control method for controlling the switching timing of the excitation current by the count of the output pulses from the encoder 25, the 180° energization in the two-phase excitation system and the 90° energization in the single phase excitation system can be selectively switched by the software of the MPU 20.

In the first embodiment, the carriage drive motor 7 is the PM type stepping motor.

Figure 7:
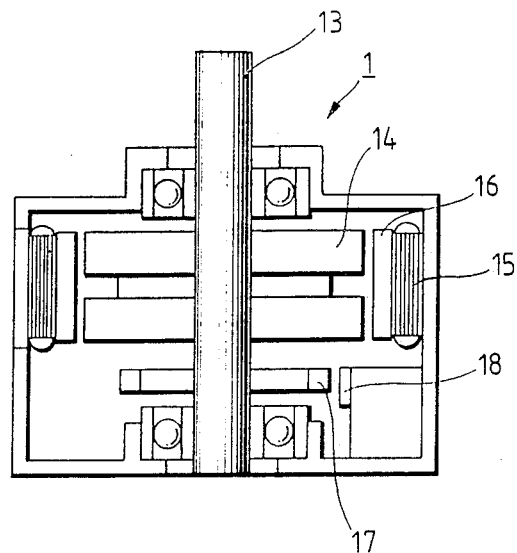
FIG. 7 shows a sectional view of a structure of a carriage drive motor which is a hybrid stepping motor used in a second embodiment of the present invention.

FIG. 7 shows a second embodiment of the present invention in which a hybrid stepping motor is used. Numeral 15 denotes a coil, and numeral 16 denotes a stator A detection disk 17 is attached to a rotor shaft 13 and an MR element substrate 18 is arranged to face the disk 17 to form an encoder 25. The switching timing of the excitation current of the motor and the rotation speed are close-loop controlled in accordance with the detection output of the encoder 25.

In the hybrid stepping motor, the number of magnetic poles of the rotor 14 is large and the number of times of switching of the excitation current per revolution is large. For example, when the number of teeth of the magnetic poles of the rotor 14 is 100, the number of times of current switching per revolution in the two-phase excitation system is 200. The encoder 25 may be designed to produce 800 pulse signals per revolution of the rotor 14 and the current switching circuit 24 may be designed to switch the excitation current at every count of four pulses.

In this manner, the hybrid stepping motor is close-loop controlled to use it as the carriage drive motor 7 so that the same effect as that of the first embodiment is attained. Because of the hybrid type, the present embodiment provides a higher output than the first embodiment.

FIGS. 8 and 9A to 9C show structures of a carriage drive motor used in a third embodiment of the present invention.

Figure 8:
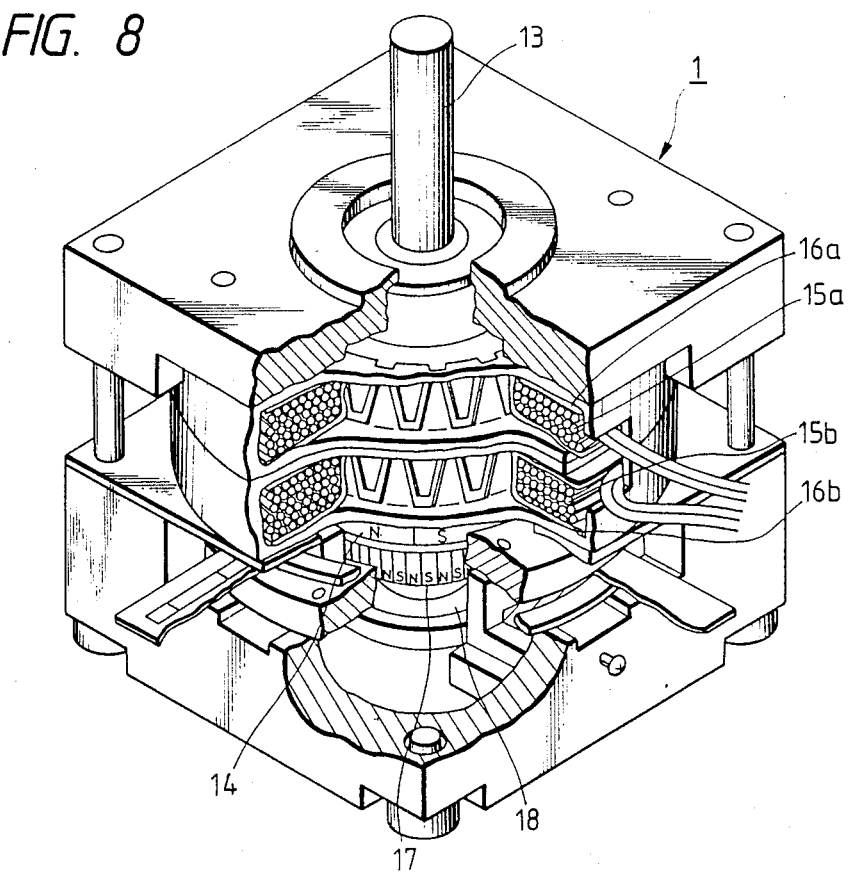
FIG. 8 shows a perspective view, partly in section, of a structure of a carriage drive motor used in a third embodiment of the present invention.
Figure 9A:
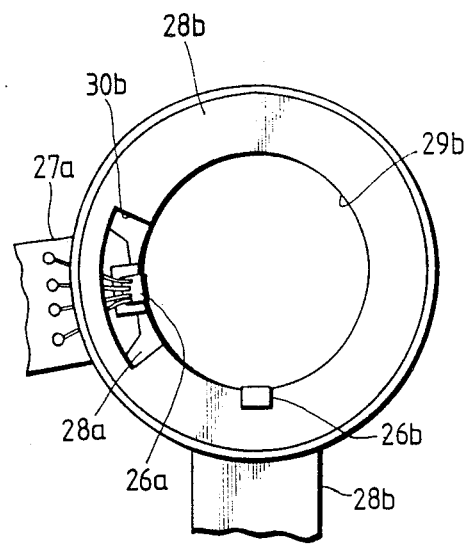
FIG. 9A shows a bottom view of a structure of a Hall element positioning member for setting a Hall element onto the motor of FIG. 8.
Figure 9B:
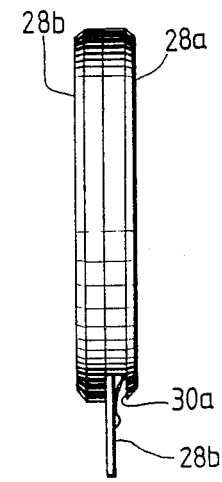
FIG. 9B shows a side view of the positioning member.
Figure 9C:
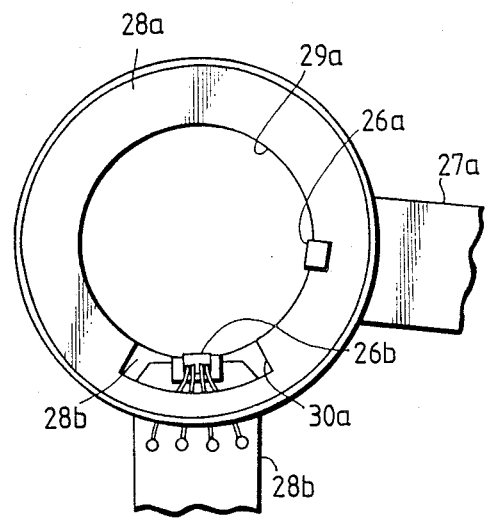
FIG. 9C shows a top view of the positioning member.

In the third embodiment, like the first embodiment, the detection disk 17 and the MR element substrate 18 are provided to a PM type stepping motor which serves as the carriage drive motor 1, to form the encoder 25, as shown in FIG. 8. Hall elements 26a and 26b shown in FIGS. 9A to 9C are further provided. The rotation angle of the rotor 14 and the magnetic pole position are detected by the encoder as they are in the first embodiment, and they are also detected by the Hall elements 26a and 26b. The start, stop and speed of the carriage drive motor 1 are controlled by the output of the encoder, and the switching timing of the excitation current is controlled by the outputs of the Hall elements 26a and 26b.

An arrangement for fixing the Hall elements 26a and 26b will now be explained. Both elements are provided on Hall element substrates 27a and 27b, respectively, which are fixed to ring-shaped Hall element positioning members 28a and 28b, respectively, having openings 29a and 29b into which the rotor 14 is loosely fitted. The positioning members 28a and 28b have sector notches 30a and 30b to accept the Hall elements 26a and 26b. The positioning members 28a and 28b are coupled together in superposition such that the Hall elements 26a and 26b are fixed into the notches 30b and 30a, respectively, as shown in FIG. 9B. The positioning members 28a and 28b are coupled to allow mutual circumferential sliding within a range to prevent the Hall element substrates 27a and 27b from abutting against the edges of the notches 30a and 30b, respectively.

The assembly comprising the Hall element positioning members 28a and 28b is mounted below the stators 16a and 16b of FIG. 8 to allow circumferential position adjustment while allowing loose fitting of the rotor 14 in the openings 29a and 29b.

With this structure, the Hall element positioning members 28a and 28b may be position-adjusted relative to the stators 16a and 16b so that the phases of the output signals of the Hall elements 26a and 26b relative to the magnetic poles of the stators 16a and 16b can be finely adjusted. Since the Hall element positioning members 28a and 28b are slidable to each other, the relative position of the Hall elements 26a and 26b can be adjusted and the phase difference between the output signals of the Hall elements 26a and 26b can be adjusted. Through those adjustments, the magnetic pole position at the switching timing of the excitation current can be precisely detected.

Where the stepping motor is used as a drive source for other mechanism of the printer, the switching timing of the excitation current and the rotation speed may also be close-loop controlled in the same manner to reduce the noise and speed up the operation.

In accordance with the present invention, a recorder which uses a stepping motor as a drive source to move at least a recording head for scan is provided with detection means for detecting a rotation angle of a rotor of the stepping motor and control means for close-loop controlling the drive of the stepping motor in accordance with the detection output of the detection means. Accordingly, the stepping motor is smoothly driven and the low noise, high speed and highly durable recorder is provided.

I claim:

1. A recording apparatus in which a recording head is moved to effect scan for recording, comprising:
   a carriage carrying the recording head;
   a stepping motor for moving the carriage;
   detection means for detecting a rotation angle position of a rotor of the stepping motor, the detection means generating a pulse signal for every predetermined angle of rotation of said rotor;
   control means for counting the pulse signals from said detection means, detecting a position of said carriage in accordance with a counted value and outputting start and stop control signals of said carriage in accordance with counted values; and
   current switching means for controlling switch-over of excitation current supplied to a coil of the stepping motor in accordance with pulse signals from said detection means, the current switching means starting switch-over control of the excitation current by the start control signal from said control means and stopping the switch-over control of the excitation current by the stop control signal.

2. A recording apparatus according to claim 1, wherein
   said control means generates further a moving direction control signal, and
   said current switching means controls a switch-over of the excitation current in response to a moving direction control signal from said control means.

3. A recording apparatus according to claim 1, wherein
   said direction means has an encoder for detecting the position of each magnetic pole of said rotor, the encoder generating a pulse for every detection of the pole position.

4. A recording apparatus according to claim 1, wherein
   said current switching means counts pulse signals from said detection means and effects switch-over control of the excitation current supplied to the coil of said step motor in accordance with the counted value.

5. A recording apparatus according to claim 1, wherein
   said current switching means has means for shorting both ends of the coil of the stepping motor in response to the control signals from said control means.

6. A recording according to claim 5 wherein said short means includes transistors and diodes.

7. A recording apparatus in which a recording head is moved for effect scan for recording, comprising:
   a carriage carrying the recording head;
   a stepping motor for moving the carriage;
   detection means for detecting a rotation angle position of a rotor of the stepping motor;
   control means for counting the pulse signals from said detection means, detecting a position of said carriage in accordance with a counted value and outputting start, stop and speed control signals for said carriage in accordance with counted values;
   current switching means for counting the pulse signals from said detection means and effective switch-over control of the excitation current supplied to a coil of said stepping motor in accordance with the counted value, the current switching means starting the switch-over control of the excitation current by the start control signal from said control means and stopping the switch-over control of the excitation current by the stop control signal; and
   speed control means for controlling electrical energization of said stepping motor in accordance with an interval of the pulse signals from said detection means, the speed control means comparing the time interval of the pulse signals from said detection means with a reference time interval corresponding to the speed control signal from said detection means and controlling the electrical energization in accordance therewith.

8. A recording apparatus according to claim 7, wherein
   said speed control means has respective reference time intervals in accordance with plural speed modes of the carriage, the speed control means selecting one reference time interval by the speed control signal from said control means and comparing the selected reference time interval with the time interval of the pulse signals from said detection means.

9. A recording apparatus in which a recording head is moved for recording, comprising:
- a carriage carrying the recording head;
- a stepping motor for moving the carriage;
- detecting means for detecting an angle of rotation of a rotor of the stepping motor, the detection means generating a pulse signal for every predetermined angle of rotation of said rotor;
- control means for counting the pulse signals from said detection means, detecting a position of said carriage and outputting start and stop signals and an initializing signal of said carriage in accordance with the counted values; and
- current switch-over means for counting the pulse signals from said detection means and effecting switch-over control of the excitation current supplied to a coil of said stepping motor in accordance with the counted value, the current switch-over means resetting the counted value and bringing the rotor to a stable position thereof in response to the initializing signal from said control means, the current switch-over means also starting switch-over control of the excitation current by the start control signal from said control means and stopping the switch-over control of the excitation current by the stop control signal.

* * * * *

UNITED STATES PATENT AND TRADEMARK OFFICE
CERTIFICATE OF CORRECTION

PATENT NO. : 4,928,050
DATED : May 22, 1990
INVENTOR(S) : AKIRA TORISAWA, ET AL.

It is certified that error appears in the above-identified patent and that said Letters Patent is hereby corrected as shown below:

COLUMN 1

Line 55, "5" should be deleted.

COLUMN 2

Line 60, "It" should read --The belt 5--.
    Line 64, "carriage, 1" should read --carriage 1--.

COLUMN 3

Line 12, "a" should read --the--.
    Line 30, "a" should be deleted.

COLUMN 4

Line 47, "carriage drive motor" should read --carriage drive motor 7--.

COLUMN 5

Line 20, "48" should read --48 times--.
    Line 24, "each" should read --at each--.
    Line 28, "5" should be deleted.
    Line 32, "the" (second occurrence) should be deleted.

COLUMN 7

Line 8, "based," should read --based--.

UNITED STATES PATENT AND TRADEMARK OFFICE
CERTIFICATE OF CORRECTION

PATENT NO. : 4,928,050
DATED : May 22, 1990
INVENTOR(S) : AKIRA TORISAWA, ET AL.

Page 2 of 2

It is certified that error appears in the above-identified patent and that said Letters Patent is hereby corrected as shown below:

COLUMN 8

Line 27, "stator" should read --stator.--.

COLUMN 9

Line 49, "I claim" should read --What is claimed is--.

COLUMN 10

Line 12, "direction means" should read --detection means--.
    Line 29, "recording" should read --recording apparatus--.
    Line 32, "for effect" should read --to effect--.
    Line 43, "effective" should read --effecting--.

Signed and Sealed this

Twenty-ninth Day of October, 1991

*Attest:*

HARRY F. MANBECK, JR.

*Attesting Officer*       *Commissioner of Patents and Trademarks*